United States Patent [19]

Wible

[11] 4,213,510

[45] Jul. 22, 1980

[54] ARTICLE RETENTION DEVICE

[75] Inventor: John E. Wible, Painesville, Ohio

[73] Assignee: Towmotor Corporation, Mentor, Ohio

[21] Appl. No.: 904,844

[22] Filed: May 11, 1978

[51] Int. Cl.[2] .............. B60R 18/02

[52] U.S. Cl. .............. 180/68.5; 248/503

[58] Field of Search .......... 180/68.5; 280/756, 179 B, 280/179 R; 248/503, 507, 154, 508, 509; 211/51; 105/497, 503; 269/79; 224/42.4, 42.46 R

[56] References Cited

U.S. PATENT DOCUMENTS

| | | | |
|---|---|---|---|
| 2,633,615 | 4/1953 | Donovan | 211/51 |
| 2,908,474 | 10/1959 | Chiarito | 248/507 |
| 3,333,810 | 8/1967 | Schlapman | 180/68.5 |
| 3,367,441 | 2/1968 | Schuster et al. | 180/68.5 |
| 3,463,542 | 8/1969 | Daniels | 180/68.5 |
| 3,704,761 | 12/1972 | Barrett | 180/68.5 |
| 3,826,115 | 7/1974 | Davis | 180/68.5 |
| 3,829,121 | 8/1974 | Ahrendt | 180/68.5 |
| 3,847,242 | 11/1974 | Kappei | 180/68.5 |
| 3,894,607 | 7/1975 | Brock | 180/68.5 |

*Primary Examiner*—David M. Mitchell
*Attorney, Agent, or Firm*—Phillips, Moore, Weissenberger, Lempio & Majestic

[57] ABSTRACT

An article retention device is provided which is adapted for restraining the movement of a heavy article from a support platform, which platform includes a base and a frame upstanding therefrom. The article retention device comprises a restraining member and a mounting bracket adapted for mounting the restraining member to the frame. The restraining member is positionable to a first position to restrain the article and to a second position to release the article. Further the restraining member includes a lower portion such that at least the lower portion is movable upwardly as the restraining member is positioned to the second position to release the article.

14 Claims, 8 Drawing Figures

ARTICLE RETENTION DEVICE

BACKGROUND OF THE INVENTION

This invention relates to a retention device for restraining movement, and particularly tipping and/or lifting movement, of an article away from a supporting platform, and particularly to restraining the movement of a heavy battery relative to the supporting platform of a vehicle.

In electrically driven vehicles, the batteries are usually mounted on a platform, and/or in a battery compartment, and then restraints are placed thereabout to prevent horizontal and/or vertical movement thereof. Such restraints are necessary since during sudden vehicle stops and starts, even the heaviest of batteries, unrestrained, may partial lifting off their supporting platform.

Of the presently known retention devices, most are not conveniently adjustable and are often excessively complex and costly in construction. For example, bolt and nut clamp devices require a wrench and an extended service period for a mechanic to screw and unscrew the retaining nuts securing the battery. Other devices are too bulky or are simply not sturdy enough to positively retain the full weight of a heavy battery.

Thus, there exists a need for a retention device that is of simple and economic construction, but which is sturdy and can withstand the above-indicated battery movement. Such a device should quickly and easily be positionable about the battery so as not to unduly extend the time referred to remove the battery for normal service.

SUMMARY OF THE INVENTION

The present invention is directed to overcoming one or more of the problems as set forth above.

According to the present invention, an article retention device is disclosed which is capable of restraining the movement of the article relative to a platform, which platform includes a base and a frame upstanding therefrom. The device comprises a restraining member and mounting means adapted to mount the restraining member to the platform frame. The restraining member is selectively positionable to a first position to restrain the article and to a second position to release the article. The mounting means are positioned on the frame and the restraining means is downwardly dependent from the mounting means. The restraining means further includes a lower portion such that at least the lower portion is movable upwardly as the restraining means is positioned to the second position to release the article.

An aspect of the invention includes locking means for selectively locking the restraining member in the first and the second position.

A further aspect of the invention comprises a restraining member including a first member that is telescopingly mounted relative to the rest of the restraining member.

Still a further aspect includes second locking means for selectively lockingly positioning the first telescoping member of the restraining member relative to the rest of the restraining member.

DESCRIPTION OF THE PREFERRED EMBODIMENT

Figure 1:
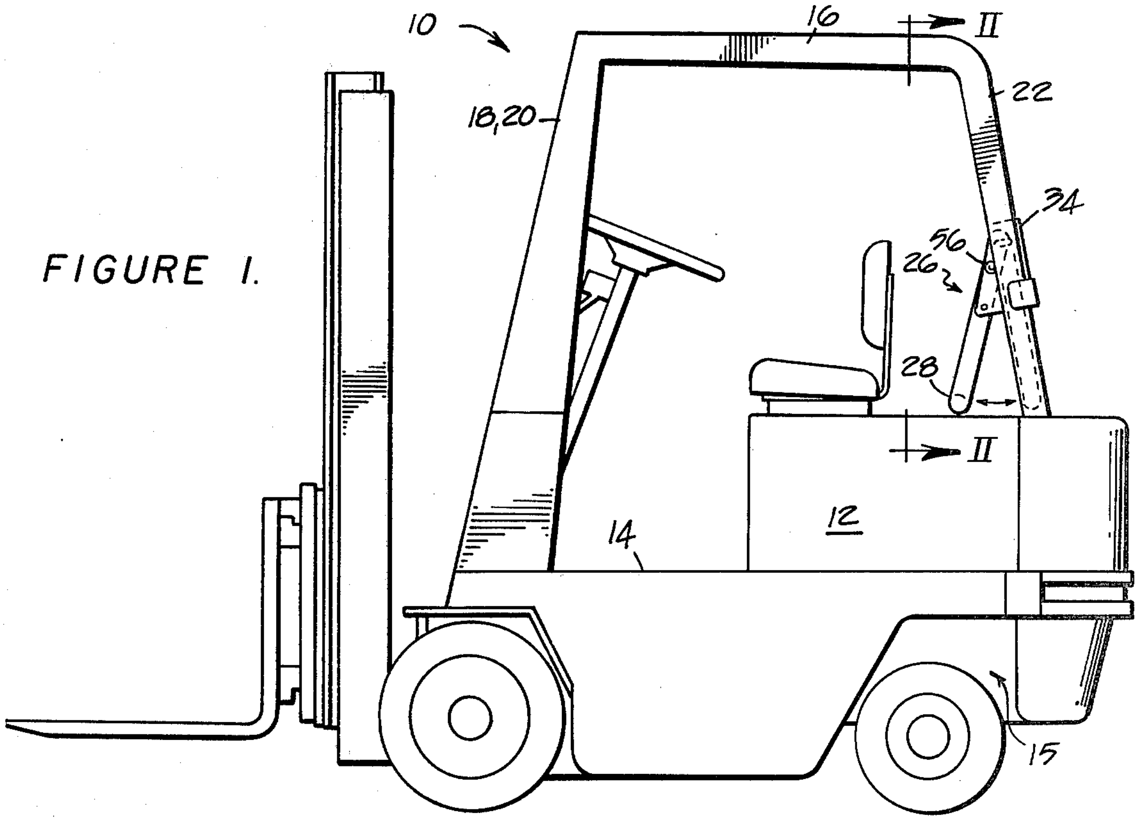
FIG. 1 is a side elevational view of the invention as incorporated into a battery actuated lift truck.
Figure 2:
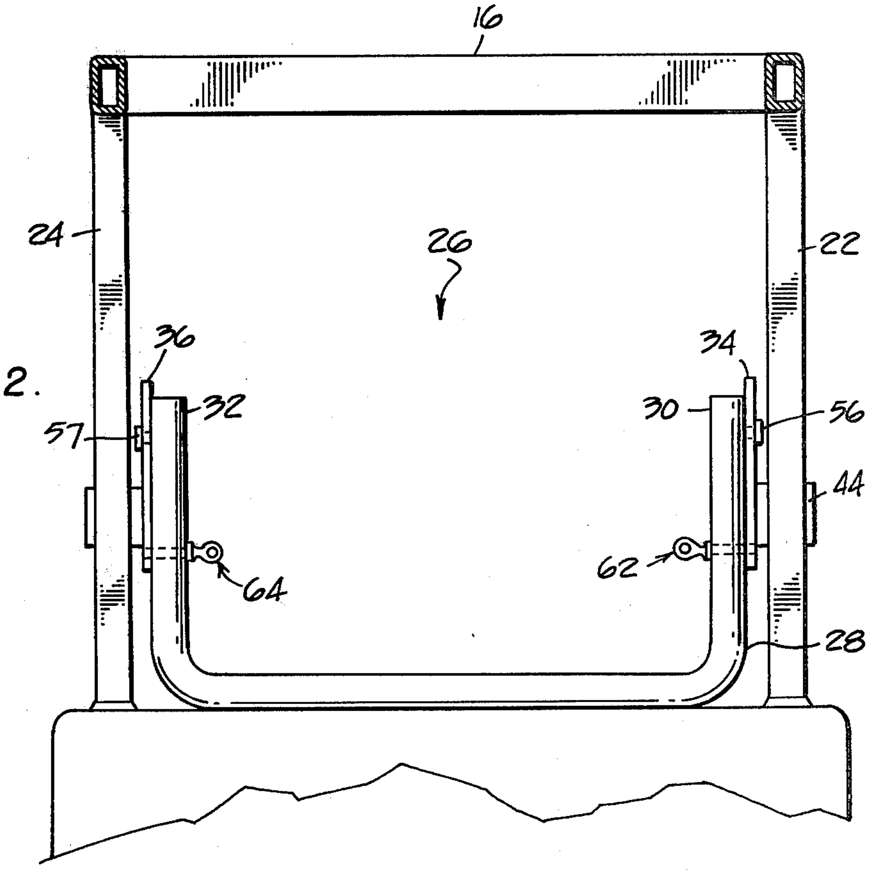
FIG. 2 is a fragmented elevation of the invention looking in the direction of the arrows on line II—II of FIG. 1.

With particular reference to FIG. 1, the retention device of the present invention is described for illustration purposes in connection with a battery powered lift truck 10. The lift truck includes a battery 12 mounted on a platform 14 of a base, generally denoted 15. An overhead guard 16 is supported by transversely spaced forward posts 18 and 20 and transversely spaced rearward posts 22, and 24 (FIG. 2). Forward posts 18 and 20 are generally upstanding and rearwardly inclined, and rearward posts 22 and 24 are also generally upstanding but are forwardly inclined so that their upper portions are advantageously positioned above the battery 12.

Figure 1A:
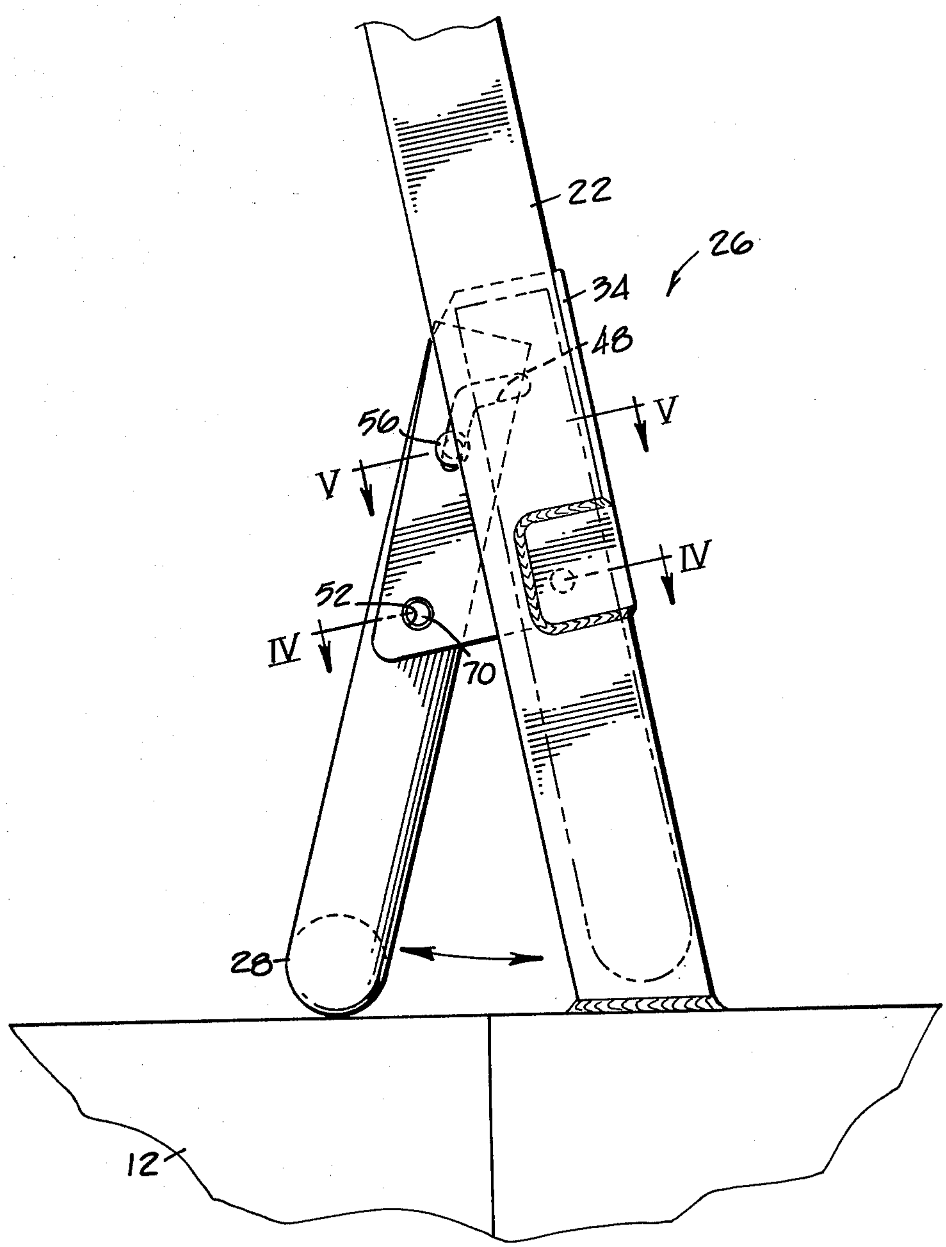
FIG. 1A is an enlarged portion of the invention of FIG. 1.
Figure 3:
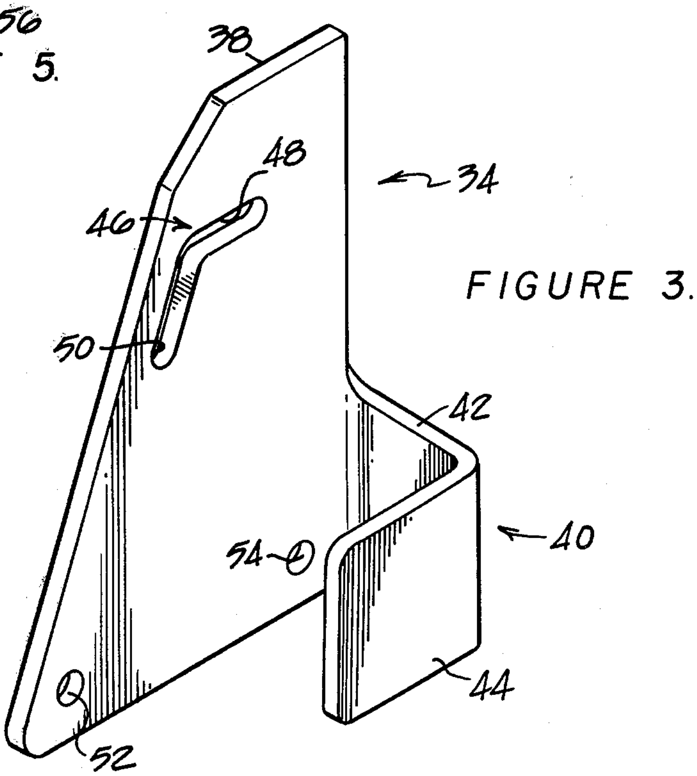
FIG. 3 is an enlarged perspective of a mounting bracket of the invention.

The preferred embodiment of the battery retention device of the invention can best be seen in FIGS. 1, 1A and 2, and is generally denoted 26. Retention device 26 includes a U-shaped retaining member 28 with upwardly extending ends 30 and 32 (FIG. 2). End 30 is movably mounted to post 22 by a mounting bracket, generally denoted 34, (FIG. 3) and end 32 is movably mounted to post 24 by a mounting bracket generally denoted 36, such that as depicted in FIG. 2, U-shaped retaining member 28 is positional generally between posts 22 and 24.

Mounting bracket 34 (FIG. 3) is presently described, and it is to be noted that as mounting bracket 36 is a mirror image of bracket 34, that this description applies equally well to bracket 36 with the exception of the above-indicated provision.

Mounting bracket 34 includes a planar body portion 38 and an L-shaped member 40, having perpendicularly associated legs 42 and 44, leg 42 being perpendicularly associated with planar body portion 38.

Planar body portion 38 includes a first aperture 46, spaced distally from leg 42. Aperture includes a generally horizontal, elongated slot portion 48 which communicates with a generally vertically inclined elongated slot portion 50. Planar body portion 38 further includes a second aperture 52 and a third aperture 54. Second aperture 52 is spaced and on a direct line from slot portion 50. Third aperture 54 is proximal leg 42.

Figure 4:
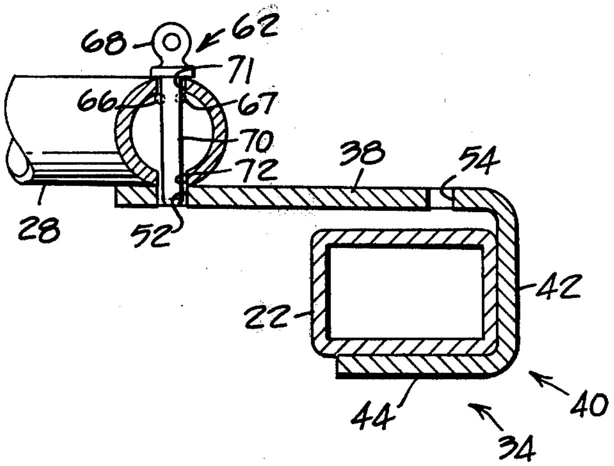
FIG. 4 is a transverse section taken along the line IV—IV of FIG. 1A.

As best shown in FIG. 4, legs 42 and 44 of mounting bracket 34 are secured to two respective sides of post 22 and planar body portion 38 is spaced from post 22. It is noted that for purposes of manufacture, that members 42 and 44 allow the appropriate space between portions 38 and post 22 to be determined quite easily as bracket 34 is secured to post 22.

Figure 5:
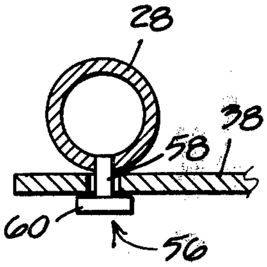
FIG. 5 is an enlarged transverse section taken along line V—V of FIG. 1A.

As can best be seen in FIGS. 1, 2, and 5, U-shaped retaining member 28 is movably mounted to bracket 34 by a pin 56 and to bracket 36 by a pin 57. Pin 56 has a shank 58 slidable mounted in first aperture 46 and pin 57 is similarly mounted to bracket 36. It is noted that as at least a portion of horizontal, elongated slot portion 48 of the first aperture 46 is located directly opposite post 22 (FIGS. 1 and 1A) and that the space between post 22 and planar body portion 38 of bracket 34 allows head 60 of pin 56 to slide therebetween.

U-shaped retaining member 28 is provided with first and second pull pins 62 and 64 (FIGS. 2 and 4), located generally adjacent ends 30 and 32 respectively. As can be seen in FIG. 4, pull pin 62 (and this discussion applies equally well to pull pin 64) includes a head 68 in the form of a ring and a shank 70 extending from head 68 and slidably mounted in coaxial transverse bores 71 and 72 of U-shaped retaining member 28. Mounted on shaft 70, proximal head 68 are two spring loaded detents 66 and 67 or alternatively a spring ring which releasingly retain pull pin 62 in bores 71 and 72 such that the end of shaft 70 projects outwardly from bore 72. The end of shaft 70 is adapted to mate selectively with second aperture 52 (FIG. 4) and third aperture 54.

The operation of battery retention device 26 is as follows. In a first rearward position, the U-shaped retaining member 28 is coplanar with rearward posts 22 and 24 as shown by the broken line in FIG. 1 and 1A. In this position, pin 56 adjacent end 30 of retaining member 28 is positioned adjacent the rearward portion of horizontal, elongated slot 48 of aperture 46 and the pin 57 adjacent end 32 of retaining member 28 is positioned in the corresponding slot portion in bracket 36. Further, the end of shank 70 of pull pin 62 is positioned through third aperture 54, and the shank of locking device 64 is similarly positioned in a corresponding aperture in bracket 36. With retaining member 28 so positioned, battery 12 can be easily removed from lift truck 10 and/or serviced in place.

With the battery serviced and replaced in lift truck 10, and with first and second pull pins 62 and 64 disengaged from the third aperture of bracket 34 and 36 respectively, retaining member 28 can be translated forwardly as pin 56 and pin 57 are slid forwardly along the horizontal, elongate slot 48 of bracket 34 and along the corresponding aperture of bracket 36. Retaining member 28 is then pivoted forwardly about pins 56 and 57 to a position such that at least the lowermost portion thereof is positioned over battery 12. Next, retaining member 28 is translated downwardly into contact with the top of battery 12 as pin 56 and pin 57 are slid downwardly in their respective vertically elongated slot portions. With retaining member 28 in contact with battery 12, pull pins 62 and 64 can engage the second apertures in brackets 34 and 36, to lockingly position retaining member 28 and the battery 12. It is to be understood that the reverse of the above-indicated steps is to be followed to facilitate removal of battery 12 from lift truck 10. That is to say briefly that retaining member 28 is translated upwardly with the resultant upward movement of pins 56 and 57 in the above-mentioned vertical slot portions. Once retaining member 28 is translated upwardly to a position above battery 12, retaining member 28 can be pivoted rearwardly about pins 56 and 57 without contacting battery 12. Retaining member 28 is then translated rearwardly, with the resultant rearward movement of pins 56 and 57 in the horizontal slot portions until the retaining member is lockingly positioned in the plane of rearward posts 22 and 24. With retaining member 28 in this position, pins 56 and 57 are positioned between the planar body portions of brackets 34 and 36 and the adjacent posts 22 and 24.

Alternatively, to accomplish the above indicated operation, other apertures (not shown) having different shapes can be substituted for aperture 46 and the corresponding aperture in bracket 36. For example, inclined aperture and crescent-shaped aperture can be used.

Figure 7:
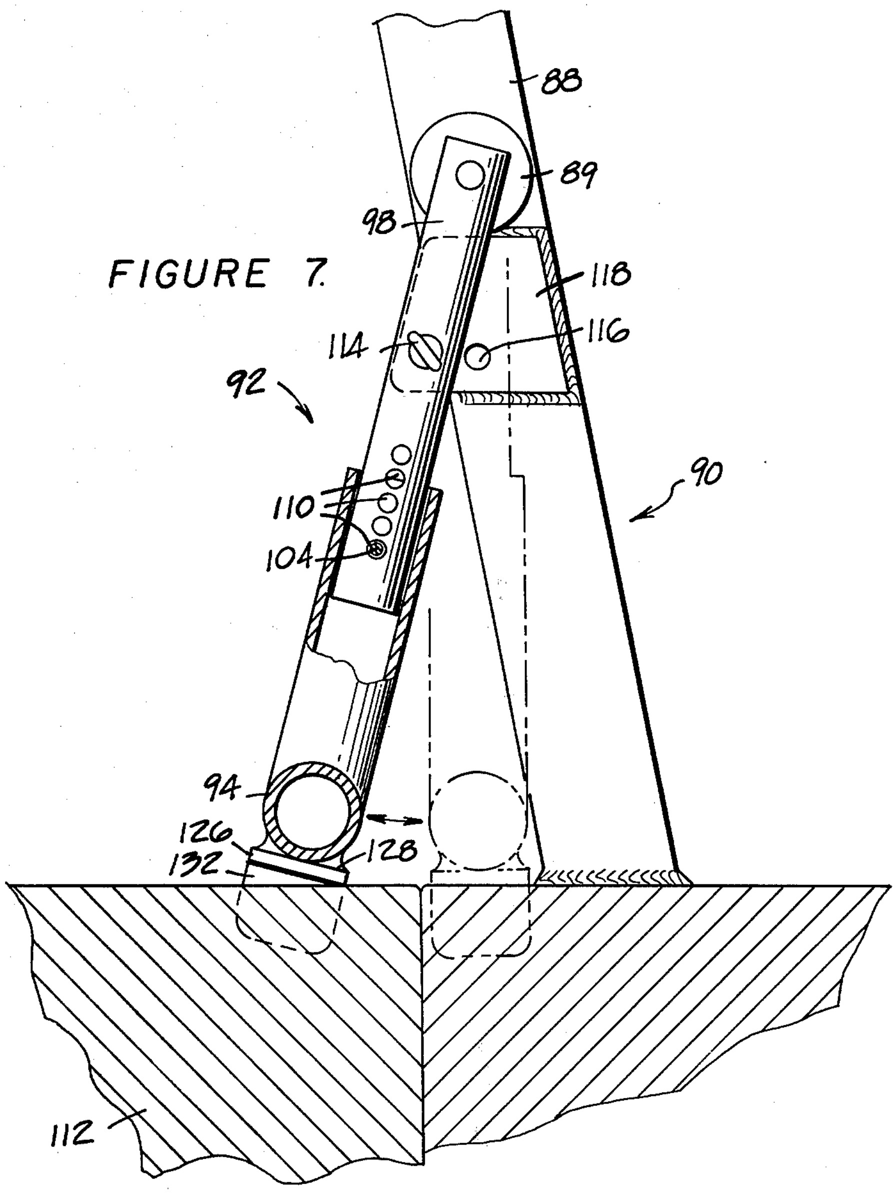
FIG. 7 is a fragmented side elevation of the alternate embodiment partially sectioned as viewed in the direction of the arrows on line VII—VII of FIG. 6.
Figure 6:
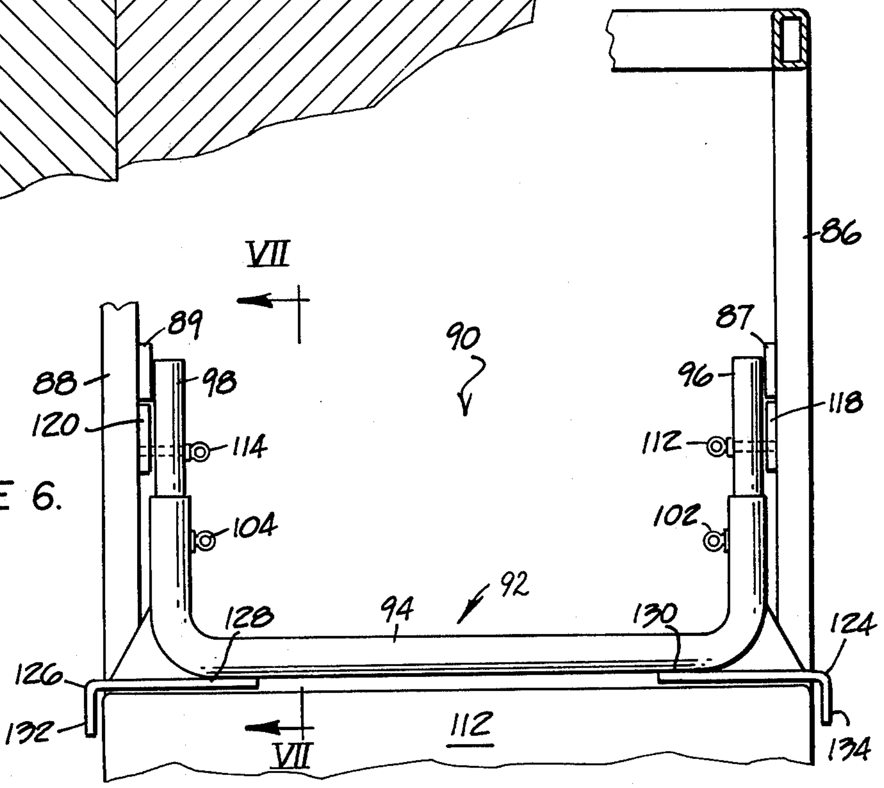
FIG. 6 is a fragmented view of an alternate embodiment of the invention.

An alternate embodiment of the battery retention device of the invention is depicted in FIGS. 6 and 7 and is generally denoted 90. Retention device 90 includes a U-shaped retaining member 92 which includes a lower U-shaped portion 94 telescopingly mounted to a mounting means including upper leg portions 96 and 98 and pivots 87 and 89, which mount upper leg portions 96 and 98 to upstanding posts 86 and 88. As can best be seen in FIG. 6, lower U-shaped portion 94 is of generally tubular construction, the upper ends of which telescope over upper leg portions 96 and 98.

Lower U-shaped portion 94 can be lockingly secured relative to upper legs 96 and 98 by pull pins 102 and 104 (FIG. 6) which are similar to pull pins 62 and 64 of the previous embodiment. Pull pin 102 is extendable into one of a plurality of apertures or bores 110 in upper leg portion 96. Locking device 104 is similarly extendable into bores provided in upper leg portion 98. Thus, lower U-shaped portion 94 can be lockingly positioned in a plurality of positions with respect to legs 96 and 98.

Mounted on legs 96 and 98 are additional pull pins 112 and 114 which are similar in construction to pull pins 102 and 104. Pins 112 and 114 are adapted to mate with the plurality of apertures 116 provided in bracket 118 and the plurality of corresponding apertures provided in bracket 120.

Retention device 90 includes first and second side retaining headers 124 and 126 which are generally L-shaped and include horizontal plates 128 and 130, and vertical plates 132 and 134 respectively. Horizontal plates 128 and 130 are rigidly secured to lower U-shaped portion 94 by webs 136 and 138. Vertical plates 132 and 134 are downwardly dependent from horizontal plates 128 and 130, respectively, on either side of battery 112 (FIG. 6). Vertical plates 132 and 134 of side retaining headers 124 and 126 prevent sideward motion of battery 112.

The operation of battery retention device 90 is as follows.

Initially, retention device 90 can be locked into a rearward position (broken line in FIG. 7), adjacent upstanding posts 86 and 88. In this position, pull pins 112 and 114 engage the most rearward apertures of brackets 118 and 120. With retention device 90 in this position, a battery 122 can be serviced.

To secure the battery 122, pull pins 112 and 114 are released from the apertures and, retention device 90 is pivoted forwardly. Simultaneously, lower U-shaped portion 94 is urged telescopingly into contact with the top of battery 122. The forwardmost portion of retention device 90 can be determined in several manners. The first manner is to lockingly position pull pins 112 and 114 in the forwardmost apertures provided in brackets 118 and 120. Then, pull pins 102 and 104 are used to lockingly position lower U-shaped portion 94 relative to upper legs 96 and 98 with U-shaped portion 94 in contact with the top of the battery 122 or a battery enclosure cover.

Alternatively, stops (not shown) can be provided on the cover for a battery 122, which stops limits the forward motion of U-shaped retaining member 92.

The embodiments of the invention in which an exclusive privilege or property is claimed are defined as follows:

1. An article retention device adapted to restrain the movement of an article relative to a platform, which platform includes a base and a frame means upstanding therefrom, and wherein the article is positioned on the base and the frame means extends above the article; the article retention device comprising:

restraining means for restraining the movement of the article, said restraining means selectively positionable to a first position to restrain the article and to a second position to release the article; and mounting means adapted for mounting the restraining means to the platform frame means at a position on the frame means generally above the article, the restraining means dependent downwardly from said mounting means; and wherein the restraining means includes a lower portion; and wherein said mounting means includes aperture means for facilitating both pivotal and translational motion of at least the lower portion of the restraining means between the first and second positions, such that at least the lower portion of the restraining means is retractably movable upwardly as the restraining means is moved to the second position to release the article.

2. An article retention device in accordance with claim 1 wherein said aperture means includes in communication a generally vertical elongated aperture and a substantially horizontal elongated aperture.

3. An article retention device in accordance with claim 2 wherein the frame means is secured to the base along at least one side of the article and wherein said generally vertical aperture is directed downwardly toward the article and said substantially horizontal aperture is directed outwardly from the article.

4. An article retention device in accordance with claim 1 wherein said mounting means includes at least one mounting bracket having a planar body portion and an extending portion, the extending portion adapted to mount to the frame means and the aperture means provided in the planar body portion.

5. An article retention device in accordance with claim 4 wherein the restraining means includes a second aperture means and said planar body portion includes a third and a fourth aperture means, said article retention device further including pin locking means, wherein the second aperture means is selectively alignable with the third aperture means so as to allow the pin locking means to lock the restraining means relative to said planar body portion in the first position restraining the article, and the second aperture means is selectively alignable with the fourth aperture means so as to allow the pin locking means to lock the restraining means relative to said planar body portion in the second position releasing the article.

6. An article retention device in accordance with claim 4 wherein the planar body portion of the mounting bracket is adapted to be spaced from the frame means, and a portion of the aperture means is adjacent the frame means, wherein the restraining means includes pin means slidingly mounted in the aperture means, such that a portion of the pin means is slidable into the space between the planar body portion and the frame means.

7. An article retention device in accordance with claim 1 wherein the frame means includes at least a first post and a second post upstanding from the base adjacent the article, and wherein the restraining means includes a generally U-shaped member, mounted between said posts, and wherein the mounting means includes a first mounting bracket adapted to be mounted to the first post and a second mounting bracket adapted to be mounted to the second post, the ends of the U-shaped member mounted to said first and second mounting brackets respectively.

8. An article retention device in accordance with claim 1 wherein said restraining means includes at least one side retaining header for .preventing sideward movement of the article.

9. An article retention device in accordance with claim 1 wherein the restraining means is telescopingly mounted to the mounting means.

10. An article retention device in accordance with claim 1 wherein the article is a battery and the platform is defined by a vehicle.

11. A battery retention device in combination with a vehicle having a base platform upon which a battery is positioned and a frame upstanding from the platform so as to extend above the battery, wherein the battery retention device comprises:

restraining means for restraining the battery relative to the vehicle; and mounting means for mounting the restraining means to the frame at a position on the frame generally above the battery, the restraining means dependent downwardly from said mounting means, said restraining means selectively positionable to a first position to restrain the battery and to a second position to release the battery, wherein the restraining means includes a lower portion such that at least the lower portion is movable upwardly as the restraining means is positioned to the second position to release the battery; and wherein the mounting means includes aperture means through which the restraining means is mounted to the mounting means for facilitating pivotable and translational motion of the restraining means between the first and second positions, and wherein the mounting means includes at least one mounting bracket having a planar body portion and an extending portion, the extending portion fixedly attached to the frame and the aperture means provided in the planar body portion.

12. A battery retention device in combination with a vehicle having a base platform upon which a battery is positioned and a frame upstanding from the platform so as to extend above the battery, wherein the battery retention device comprises:

restraining means for restraining the battery relative to the vehicle; and mounting means for mounting the restraining means to the frame at a position on the frame generally above the battery, the restraining means dependent downwardly from said mounting means, said restraining means selectively positionable to a first position to restrain the battery and to a second position to release the battery, wherein the restraining means includes a lower portion such that at least the lower portion is movable upwardly as the restraining means is positioned to the second position to release the battery, and wherein the mounting means includes a first aperture means through which the restraining means is mounted to the mounting means for facilitating pivotable and translational motion of the restraining means between the first and second positions, and wherein the restraining means further includes a locking means and the mounting means includes at least a second and a third aperture means, the locking means for selectively engaging the second and third aperture means for lockingly positioning the restraining means in the first and second positions respectively.

13. A battery retention device in combination with a vehicle having a base platform upon which a battery is positioned and a frame upstanding from the platform so as to extend above the battery, wherein the battery retention device comprises:

restraining means for restraining the battery relative to the vehicle; and mounting means for mounting the restraining means to the frame at a position on the frame generally above the battery, the restraining means dependent downwardly from said mounting means, said restraining means selectively positionable to a first position to restrain the battery and to a second position to release the battery, and wherein the restraining means includes a lower portion; and wherein said mounting means includes aperture means for facilitating pivotal and translational motion of at least the lower portion of the restraining means between the first and second positions, such that at least the lower portion of the restraining means is retractably movable upwardly as the restraining means is moved to the second position to release the battery.

14. The battery retention device of claim 13 wherein the restraining means is telescopingly mounted to the mounting means.

* * * * *